United States Patent
Ley et al.

(10) Patent No.: US 12,040,662 B2
(45) Date of Patent: Jul. 16, 2024

(54) SPOKED ROTOR HAVING SECTIONED, HIGH VOLUME MAGNETS

(71) Applicant: Nidec Motor Corporation, St. Louis, MO (US)

(72) Inventors: Bruce Ley, Ossian, IN (US); Timothy H. Sullivan, Marcellus, NY (US); Scott Wolf, Fort Wayne, IN (US)

(73) Assignee: Nidec Motor Corporation, St. Louis, MO (US)

( * ) Notice: Subject to any disclaimer, the term of this patent is extended or adjusted under 35 U.S.C. 154(b) by 549 days.

(21) Appl. No.: 17/323,814

(22) Filed: May 18, 2021

(65) Prior Publication Data

US 2022/0376570 A1    Nov. 24, 2022

(51) Int. Cl.
*H02K 1/27* (2022.01)
*H02K 1/276* (2022.01)

(52) U.S. Cl.
CPC ................... *H02K 1/2773* (2013.01)

(58) Field of Classification Search
CPC ............. H02K 1/2773; H02K 2201/06; H02K 2213/03; H02K 1/14; H02K 5/04
See application file for complete search history.

(56) References Cited

U.S. PATENT DOCUMENTS

2016/0006303 A1* 1/2016 Hoemann ............ H02K 1/2773
310/156.56

FOREIGN PATENT DOCUMENTS

| DE | 102012218995 | | 4/2014 |
| JP | 2013183510 | | 9/2013 |
| KR | 20190062983 A | * | 6/2019 |

OTHER PUBLICATIONS

Office Action from Japanese Patent Application No. 2022-079736 (dated Sep. 12, 2023).
Office Action from Japanese Patent Application No. 2022-07936 (dated May 9, 2023).

* cited by examiner

*Primary Examiner* — Thomas Truong
(74) *Attorney, Agent, or Firm* — Hovey Williams LLP

(57) ABSTRACT

A rotor assembly for an electric motor includes a rotor core and a plurality of magnets. The rotor core defines a rotation axis. Each of the magnets includes a magnet stem portion and a magnet arm portion. The magnet stem portion extends radially relative to the rotational axis to present a radially outermost stem end. The magnet arm portion is located at least in part radially outward from the stem end. In addition, the magnet arm portion extends circumferentially in opposite directions relative to the magnet stem portion.

16 Claims, 9 Drawing Sheets

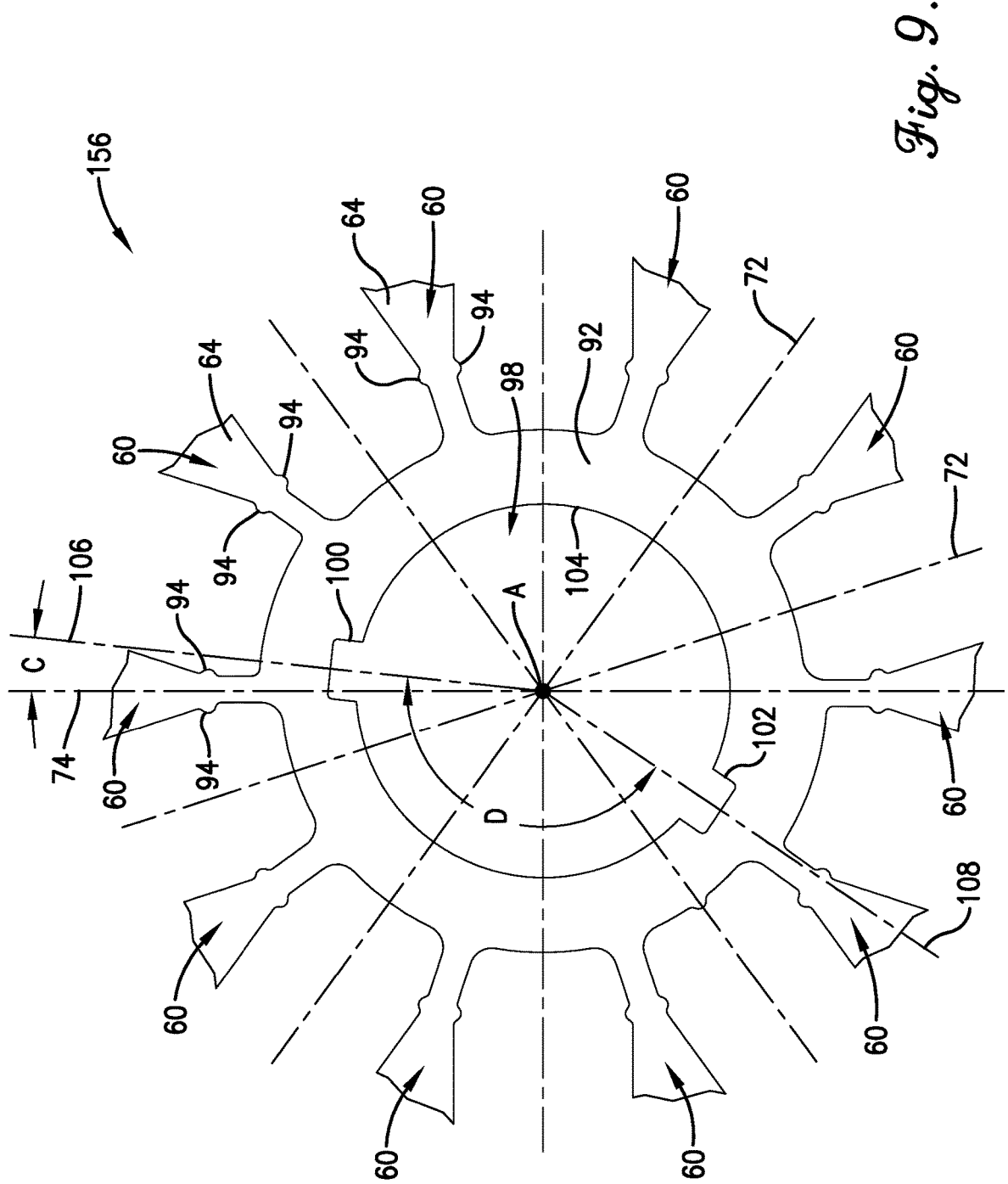

SPOKED ROTOR HAVING SECTIONED, HIGH VOLUME MAGNETS

FIELD OF THE DISCLOSURE

The embodiments described herein relate generally to a rotor assembly for an electric motor. More particularly, embodiments of the present invention concern rotor assemblies having sectioned, high volume magnets.

BACKGROUND

At least some known spoked-rotor motors utilize flat rectangular magnet slabs arranged radially like the blades of a paddle-boat wheel, but with pie-shaped sectors of laminated steel between each "blade." Spoked-rotor motors typically concentrate the flux produced by two adjacent magnet poles onto the curved face of a single steel sector, thereby producing a higher magnetic flux density than a single magnet could produce if it were mounted on the surface of the rotor. As such, the flux concentration properties of spoked-rotor motors typically facilitate the use less expensive magnet materials to produce motor performance on a par with surface mount rotor motors that contain stronger, but more expensive rare-earth materials.

The less expensive materials, however, usually produce a far weaker magnetic field per unit of volume. Accordingly, larger magnet volumes are required to provide enough overall magnetic flux when focused upon the poles. One of the most important magnet dimensions is the thickness of the magnet slab. Generally, a larger thickness dimension is better for motor performance. However, thicker magnets interfere with each other proximate the center of the rotor. Reducing a radial height of the magnets provide additional space proximate the center of the rotor but reduces the overall flux available.

The use of tapered magnets may alleviate crowding of the magnets at the center of the rotor. Tapered magnets, however, are susceptible to severe manufacturing problems caused by the large change in thickness of the ferrite material. Tapered ferrite magnets suffer from cracking in most grades of ferrite material. Accordingly, simply tapering the magnets to account for crowding at the center of the rotor results in prohibitive cost and production problems.

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a rotor assembly for an electric motor is provided. The rotor assembly includes a rotor core defining a rotational axis and a plurality of magnets spaced arcuately about the rotor core. Each of the magnets includes a magnet stem portion and a magnet arm portion. The magnet stem portion extends radially relative to the rotational axis to present a radially outermost stem end. The magnet arm portion is located at least in part radially outward from the stem end and extends circumferentially in opposite directions relative to the magnet stem portion.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 9 is an enlarged fragmentary front plan view of a central portion of the lamination shown in FIG. 6.

Figure 1:
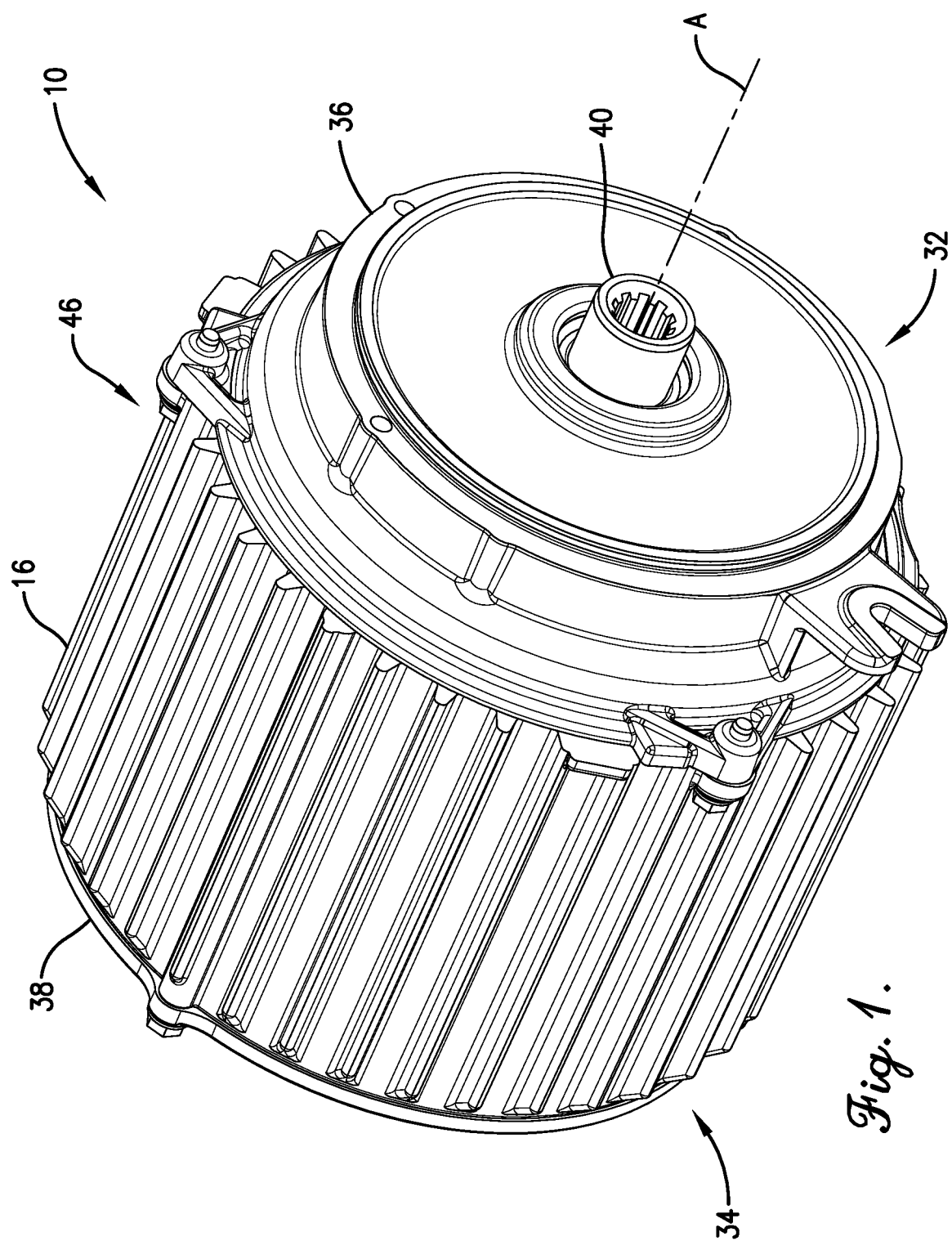
FIG. 1 is a perspective view of an exemplary electric motor, in accordance with one aspect of the present invention.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal or rotational axis of the motor assembly. The terms "radial" and "radially" refer to directions and orientations extending substantially perpendicular to the rotation axis. The terms "tangent" and "tangential" refer to the directions and orientations extending substantially perpendicular to a radial direction of the motor assembly. In addition, as used herein, the terms "circumferential" and "circumferentially" refer to directions and orientations extending in the general direction around the rotation axis of the motor assembly (such references not being limited to pure circular extension or to the periphery or outer perimeter of the object unless the context clearly indicates otherwise). Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Broadly, this disclosure is directed to a spoked rotor electric machine that includes geometry in each of the laminated rotor core magnet slots to facilitate increasing a volume of the permanent magnet(s) contained therein. Each magnet slot is generally defined as a "T" shape, where the corresponding magnets include two (2) commonly available flat rectangular slab-shaped magnets. Simple slab-shaped magnets are commonly available and are manufactured in highly optimized production processes. The magnet arm portion (i.e., the horizontal portion of the "T" shape) is magnetized to preserve the generally circumferential direction of the magnetic poles. The magnet stem portion (i.e., the vertical portion of the "T" shape) is positioned in a traditional spoked rotor orientation and has a thinner circumferential profile than the circumferential profile of the arm portion, which facilitates positioning and fit in the crowded region proximate a center of the rotor core. Furthermore, the disclosure provides geometry that positions the magnet arm portion relative to a nominal outer circumferential surface of the rotor core to facilitate decreasing a demagnetizing field intensity potentially generated by the windings of the electric machine.

An advantage of this spoked rotor design is that it eliminates the need for tapered magnets, which are prohibitively expensive to manufacture and are highly susceptible to cracking. As such, using simple slab-shaped magnets as provided by this invention translates to significant cost reductions and productivity improvements. An added benefit is the ability to increase the magnetic flux focused upon each of the poles of the rotor by increasing the volume of magnetic material in each pole. Increasing the magnetic flux facilitates increasing the performance of the motor.

Example Electric Motor

Figure 2:
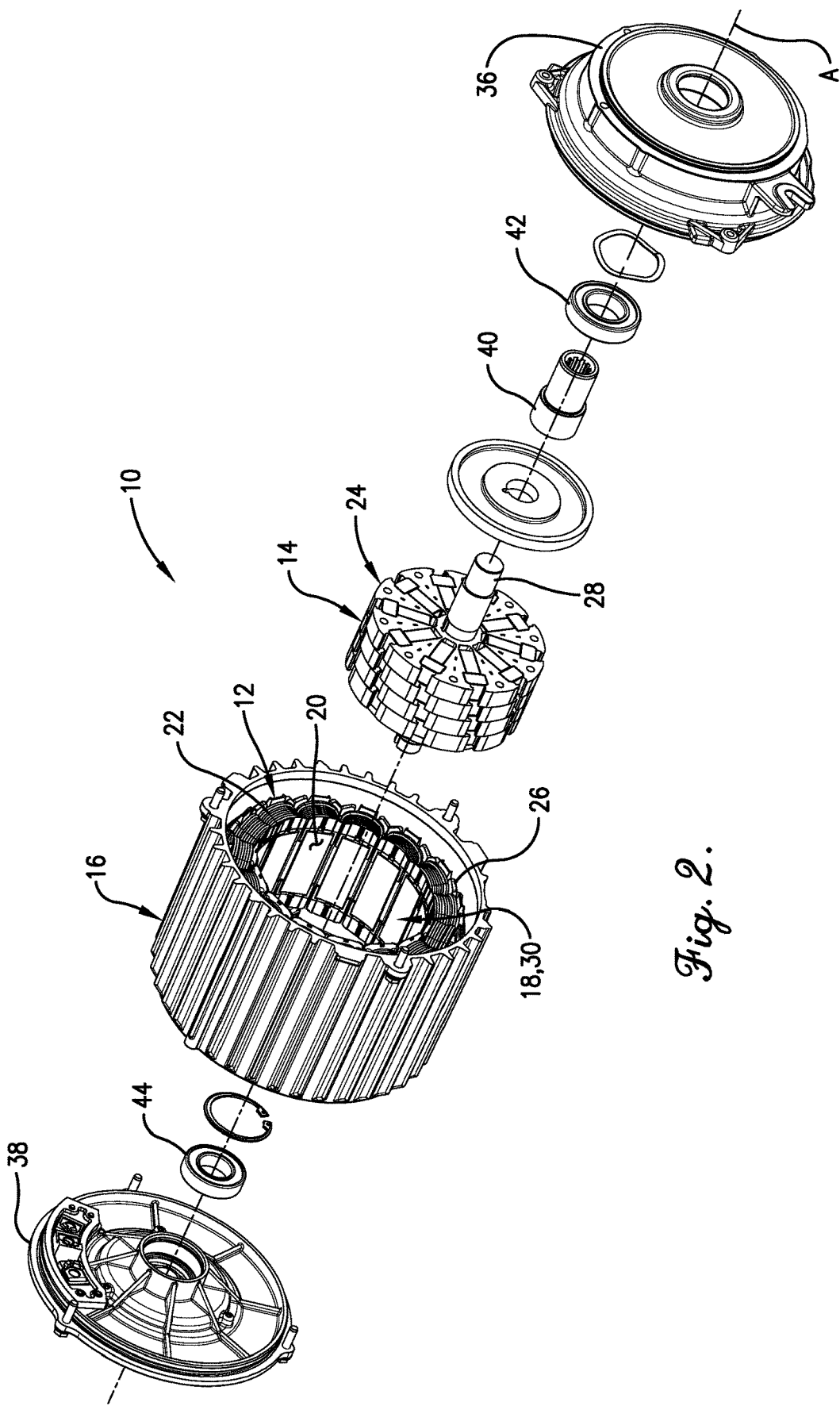
FIG. 2 is an exploded perspective view of at least a portion of the electric motor shown in FIG. 1.

FIG. 1 is a perspective view of an exemplary electric motor 10, in accordance with one aspect of the present invention. FIG. 2 is an exploded perspective view of at least a portion of the electric motor 10. In the exemplary embodiment, the electric motor 10 is illustrated as an inner rotor motor. As will be described, an inner rotor motor has magnets positioned radially inward relative to windings, which function as a stator. However, according to some aspects of the present invention, the electric motor 10 may alternately be an outer rotor motor or dual rotor motor.

As shown in FIG. 2, the illustrated electric motor 10 broadly includes a stator assembly 12 and a rotor assembly 14 substantially enclosed within an outer shell 16. The rotor assembly 14 is supported for rotation relative to the stator assembly 12 about a rotation axis "A." The outer shell 16 is generally cylindrical in shape and includes a cavity 18 for receiving at least a portion of the stator assembly 12 and the rotor assembly 14.

The stator assembly 12 is generally toroidal in form and defines a stator axis that is coaxial with the rotation axis "A." However, according to some aspects of the present invention, it is permissible for the axes to be non-coaxial. The stator assembly 12 preferably includes a stator core 20 and a plurality of coils 22 wound about the stator core 20. Furthermore, in some embodiments, the stator assembly 12 includes a plurality of electrically insulative coverings 26 positioned between the stator core 20 and the coils.

The stator core 20 preferably is fabricated from steel and may be of either solid or laminated construction. Alternatively, or additionally, the stator core 20 may be segmented in form. However, according to certain aspects of the present invention, the stator core 20 may be fabricated from any one or more of a variety of suitable materials and/or construction methods.

The stator core 20 preferably includes an annular yoke (not shown) and a plurality of arcuately spaced apart teeth (not shown) extending at least generally radially inward from the yoke. It is contemplated that the stator core 20 can have any number of teeth that enables the electric motor 10 to function as described herein. The plurality of coils 22 are formed by electrically conductive wiring wound being about each of the teeth. The wiring encircles each tooth to form the coils 22, with each of the coils 22 corresponding to one of the teeth. The wiring is preferably copper, although aluminum or any one or more of a variety of electrically conductive materials may be used without departing from the scope of the present invention.

In the exemplary embodiment, the rotor assembly 14 is depicted as a brushless permanent magnet rotor assembly and includes a rotor core 24, a rotor shaft 28, and a shaft coupler 40. The rotor shaft 28 defines a rotation axis for the rotor assembly 14. The rotor assembly 14 also includes a plurality of magnets 48, each magnet including a magnet stem portion 48a and a magnet arm portion 48b, as will be described in greater detail below. The rotation axis of the rotor assembly 14 is coaxial with the rotation axis "A." It is noted, that according to certain aspects of the present invention, the rotor core 24 may be constructed for use in an electric generator or other electric machine that includes a stator assembly 12.

The rotor core 24 is generally cylindrical in form and preferably is fabricated from steel. The rotor core 24 may be of either solid or laminated construction. Alternatively, or additionally, the rotor core 24 may be segmented in form. However, according to certain aspects of the present invention, the rotor core 24 may be fabricated from any one or more of a variety of suitable materials and/or construction methods.

As described above, the electric motor 10 includes the outer shell 16. The outer shell 16 is generally cylindrical in shape and extends generally circumferentially about the stator assembly 12. Alternatively, according to certain aspects of the present invention, the outer shell 16 may extend about the stator assembly 12 in such a way as to provide one or more flat sides or to be otherwise alternatively shaped. In the exemplary embodiment, the outer shell 16 presents axially opposite first and second shell ends 32 and 34, respectively, and extends substantially continuously about the stator assembly 12 and rotor assembly 14 to enclose, at least in part, the stator assembly 12 and the rotor assembly 14. According to certain aspects of the present invention, the outer shell 16 includes openings or slots therethrough. For example, in certain embodiments, one or more openings or slots may be provided to facilitate ventilation and/or access.

The outer shell 16 forms a portion of a motor case 46 of the electric motor 10. The motor case 46 includes the outer shell 16 and first and second endshields 36 and 38, respectively. The outer shell 16 and the first and second endshields 36 and 38 cooperatively define a motor chamber 30 that at least substantially receives the stator assembly 12 and the rotor assembly 14. More particularly, the first endshield 36 is positioned adjacent the first shell end 32 and coupled thereto. In addition, the second endshield 38 is positioned adjacent the second shell end 34 and coupled thereto. Specifically, the outer shell 16 is coupled to and held in place between the first and second endshields 36 and 38 by a plurality of fasteners (not shown) extending between and coupled to the endshields 36 and 38. It is contemplated that, in certain aspects of the present invention, one more of the first and second endshields 36 and 38 may be located inwardly or spaced outward from the respective shell ends 32 and 34.

The electric motor 10 includes first and second bearing assemblies 42 and 44 that cooperatively rotatably support the rotor shaft 28 of the rotor assembly 14. The first endshield 36 is configured to support the first bearing assembly 42, and the second endshield 38 is configured to support the second bearing assembly 44. Alternative or additional bearing assembly supports may be provided without departing from the scope of the present invention.

Rotor Assembly

Figure 3:
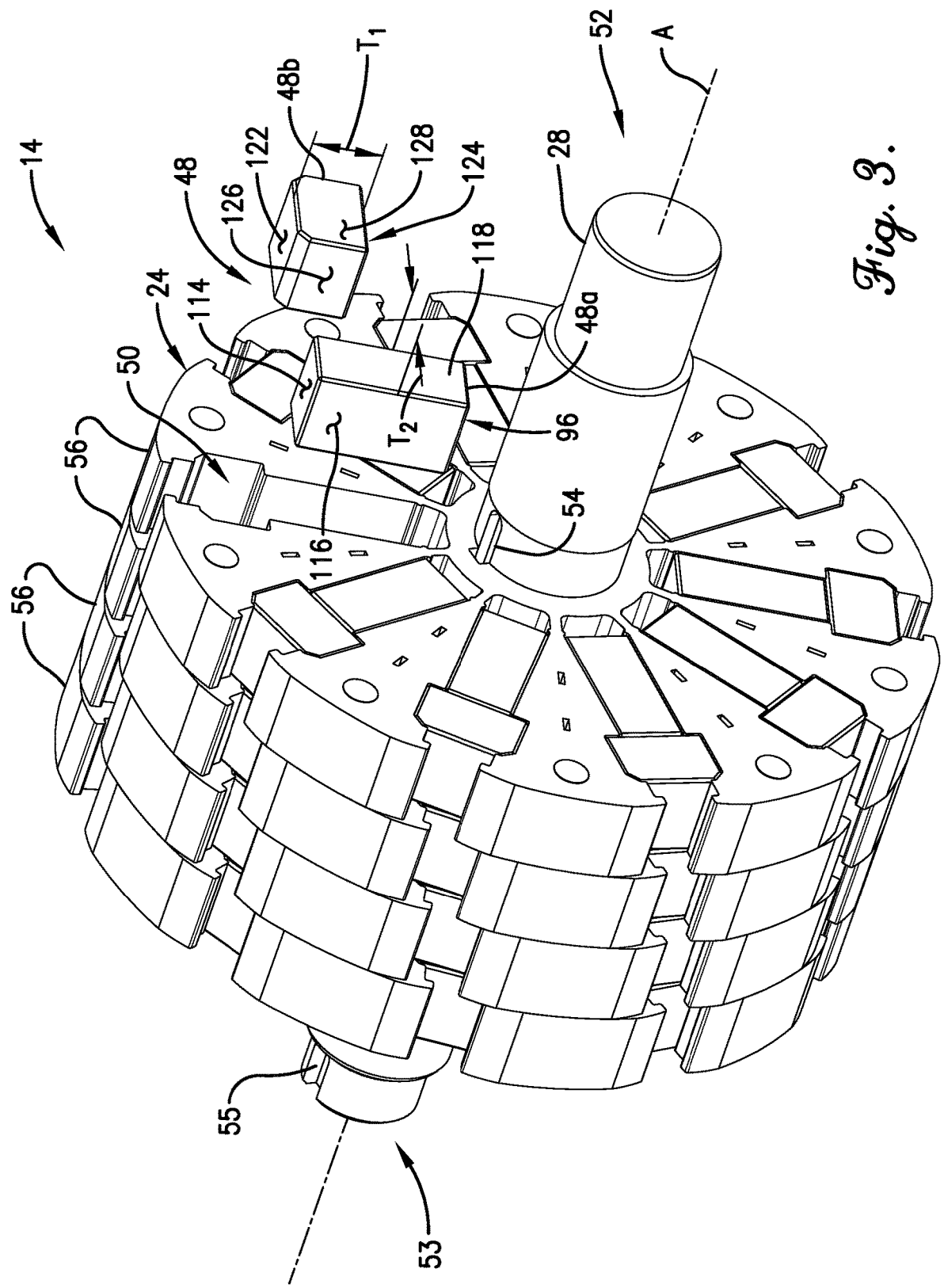
FIG. 3 is a perspective view of a rotor assembly of the electric motor shown in FIG. 1, illustrating the insertion of permanent magnets into an axially extending magnet receiving slot of the rotor core.
Figure 4:
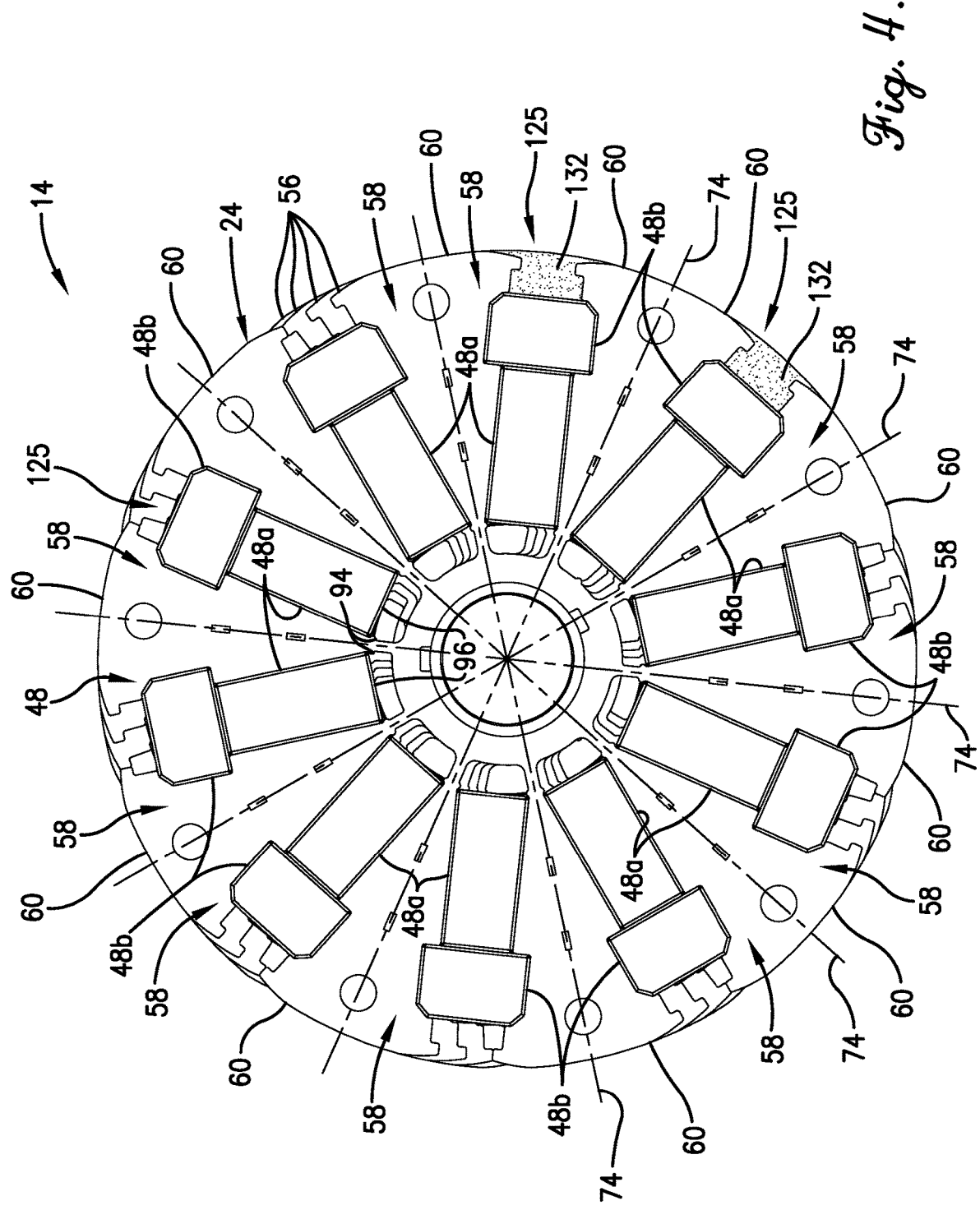
FIG. 4 is a front plan view of the rotor assembly shown in FIG. 3.

FIG. 3 is a perspective view of the rotor assembly 14 of the electric motor 10 illustrating the insertion of a pair of permanent magnet stem portions 48a and magnet arm portions 48b into an axially extending magnet receiving slot 50 of the rotor core 24. FIG. 4 is a front plan view of the rotor assembly 14. In the exemplary embodiment, the rotor shaft 28 extends axially through the rotor core 24 to define the rotation axis "A." The rotor shaft 28 is fixedly coupled to the rotor core 24 and positioned concentrically relative thereto. The rotor shaft 28 includes a first end 52 that extends forward from the rotor core 24 and a shorter second end 53 that extends rearward from the rotor core 24. The rotor shaft 28 includes a keyway slot 54 defined therein for clocking laminations of the rotor core 24, as described herein. The second end 53 includes a slot 55, although, in some aspects of the present invention, the slot 55 may be omitted.

The rotor assembly 14 includes a plurality of magnet receiving slots 50 arranged arcuately about the rotation axis "A" or rotor shaft 28. Preferably, the magnet receiving slots are evenly spaced. It is permissible according to some aspects of the present invention, however, for uneven arrangements or variably spaced arrangements to be used. The rotor assembly 14 also includes a plurality of permanent magnet stem portions 48a and magnet arm portions 48b, where each magnet receiving slot 50 includes one (1) of a magnet stem portion 48a and one (1) of a magnet arm portion 48b inserted therein. In the exemplary embodiment, the rotor core 24 and the magnet stem portions 48a and magnet arm portions 48b are rigidly coupled together and are configured to rotate with the rotor shaft 28.

In the exemplary embodiment, the rotor core 24 is fabricated from a plurality of lamination stacks 56, each of which may be rotated or arcuately offset at various angles about the rotation axis "A." The lamination stacks 56 are in the form of plate or laminations 156 (see FIG. 6) stacked or placed one on top of the other in face-to-face contact such that the rotor core 24 extends axially along the rotation axis "A" a predetermined length. Each lamination stack 56 presents opposite axial faces 110 and 112 (see FIG. 5), with one of the faces 110 or 112 facing a first axial direction and the other facing the opposite axial direction. The plurality of laminations 156 defining each stack are preferably interlocked (e.g., coupled to each other), although certain aspects of the present invention contemplate the use of loose laminations. In the exemplary embodiment, each of the laminations 156 is fabricated (e.g., machined, stamped, punched, etc.) from a suitable material, including, for example, and without limitation, a magnetically permeable material, such as iron, steel, or a steel alloy. It is noted, that in various aspects of the present invention, the laminations may include laminations having different forms or may include laminations having substantially the same form.

As described above, the rotor core 24 includes a plurality of generally radially extending magnet receiving slots 50. Each magnet receiving slot 50 is positioned within a pole sector 58 of the rotor assembly 14. The illustrated embodiment includes ten (10) magnet receiving slots 50, thus defining ten (10) rotor pole sectors 58. It is noted that in other aspects of the present invention, the rotor core 24 may include more or fewer pole sectors 58, depending on design requirements. It is also noted that the magnet stem portions 48a and magnet arm portions 48b are shown somewhat schematically for purposes of illustration but are generally sized to fit tightly within the magnet receiving slots 50 to facilitate a secure, non-moving fit with the rotor core 24. The illustrated embodiment depicts a single pair of magnet stem portions 48a and magnet arm portions 48b extending substantially the full axial length of a corresponding magnet receiving slot 50 of each lamination stack 56. However, aspects of the present invention contemplate multiple axially arranged magnet stem portions 48a and magnet arm portions 48b within each respective magnet receiving slot 50.

Referring to FIG. 3, in the exemplary embodiment, the rotor assembly 14 includes four (4) lamination stacks 56 that define the rotor core 24. As described herein, the exemplary rotor core 24 is a ten (10) pole rotor core. Each lamination stack 56 shown in FIGS. 3 and 4 is substantially the same. However, to define the skew of the rotor core 24, axially adjacent lamination stacks 56 are rotated about the rotation axis "A" a predetermined amount relative to each adjacent lamination. In a preferred embodiment, each lamination stack 56 is rotated in the same direction an amount equal to about four degrees (4°) relative to adjacent laminations. For example, each lamination stack 56 may be rotated an amount in a range between and including about three degrees (3°) and about five degrees (5°). In other aspects of the present invention, the lamination stacks 56 may be rotated about the rotation axis "A" any alternative amount that enables the rotor core 24 to function as described herein.

Exemplary Lamination

Figure 5:
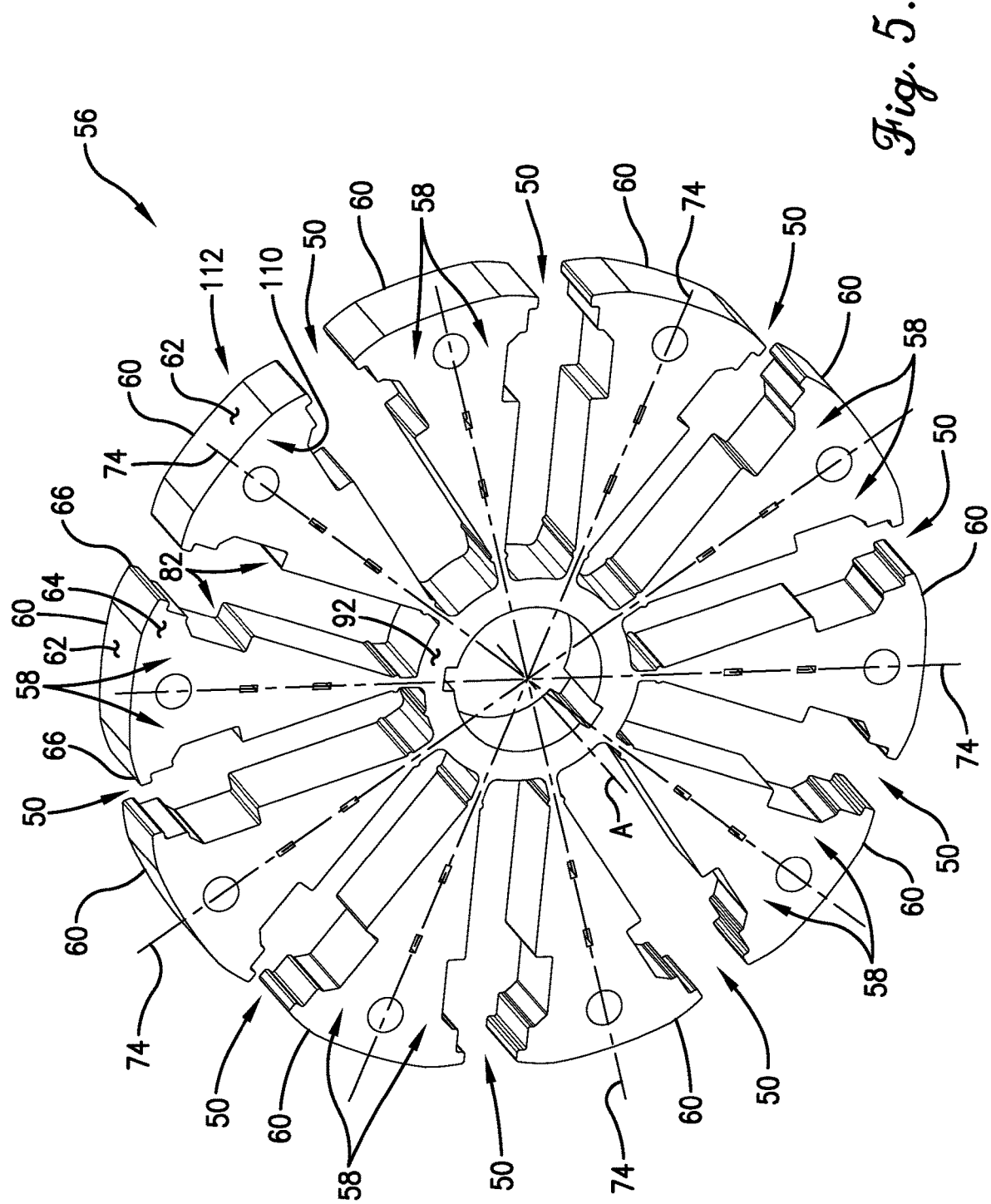
FIG. 5 is a perspective view of a stack of laminations used to define a rotor core of the rotor assembly shown in FIG. 3.
Figure 6:
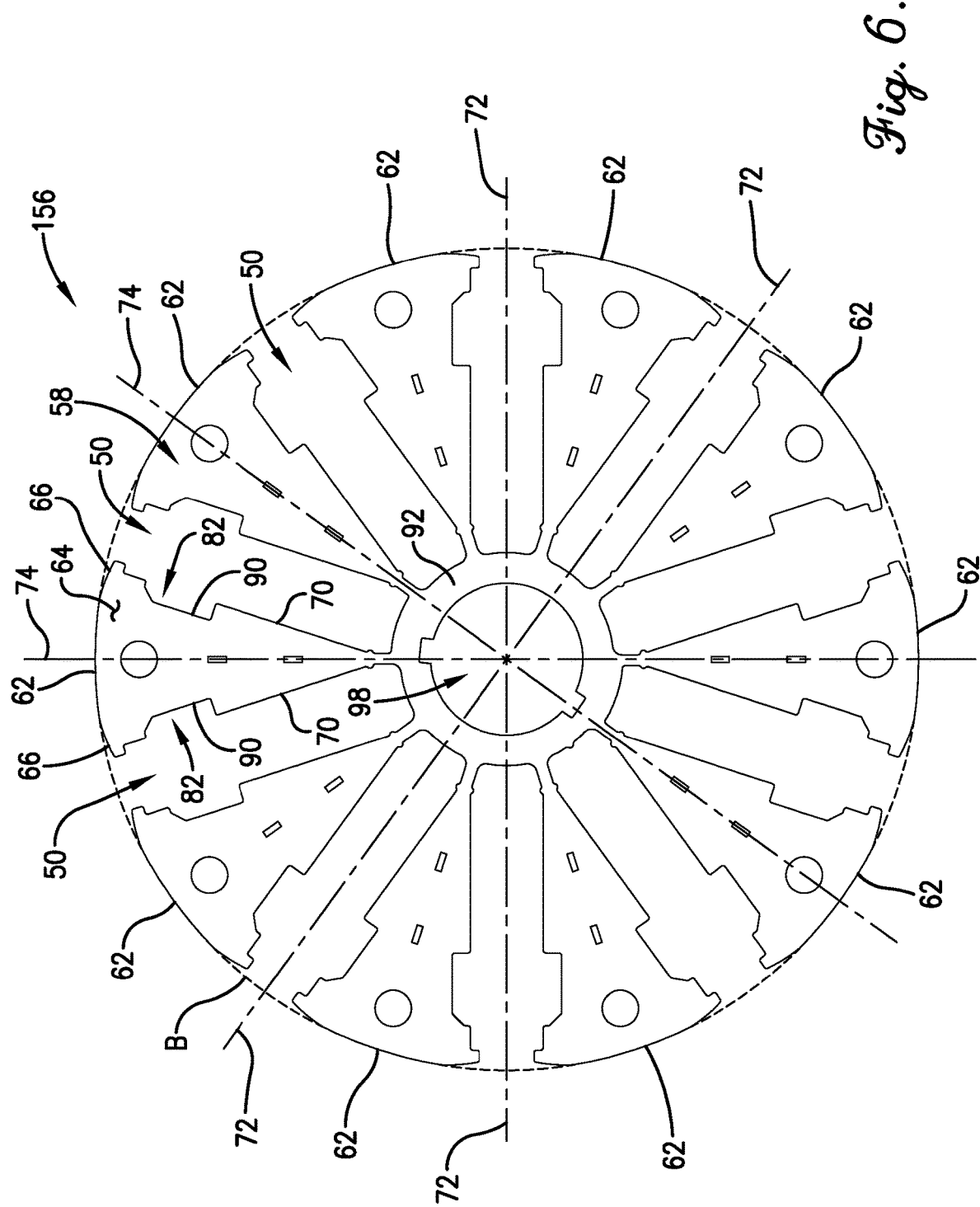
FIG. 6 is a front plan view of one of the laminations shown in FIG. 5.
Figure 7:
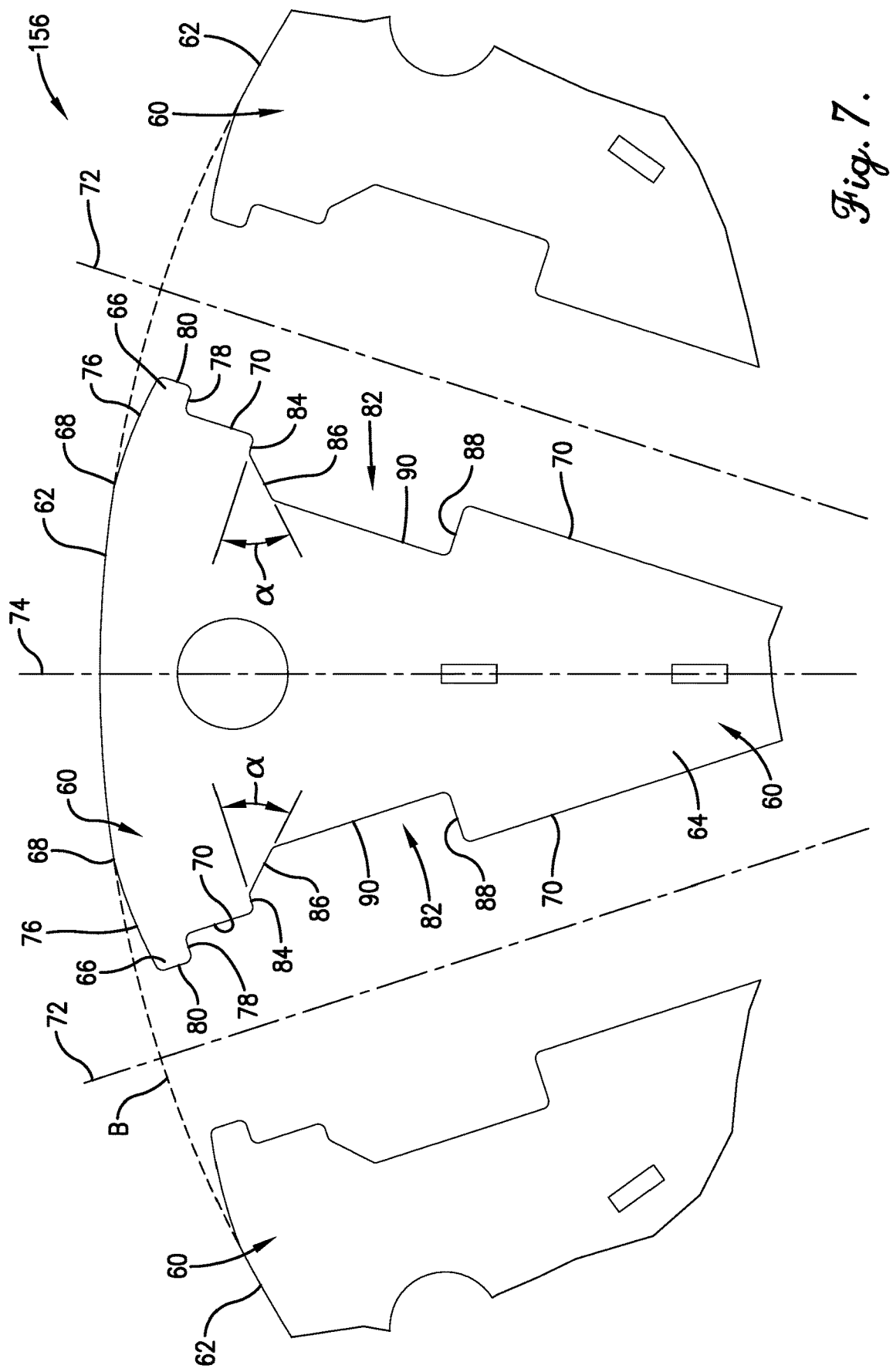
FIG. 7 is an enlarged, fragmentary front plan view of an outer portion of the lamination shown in FIG. 6.
Figure 8:
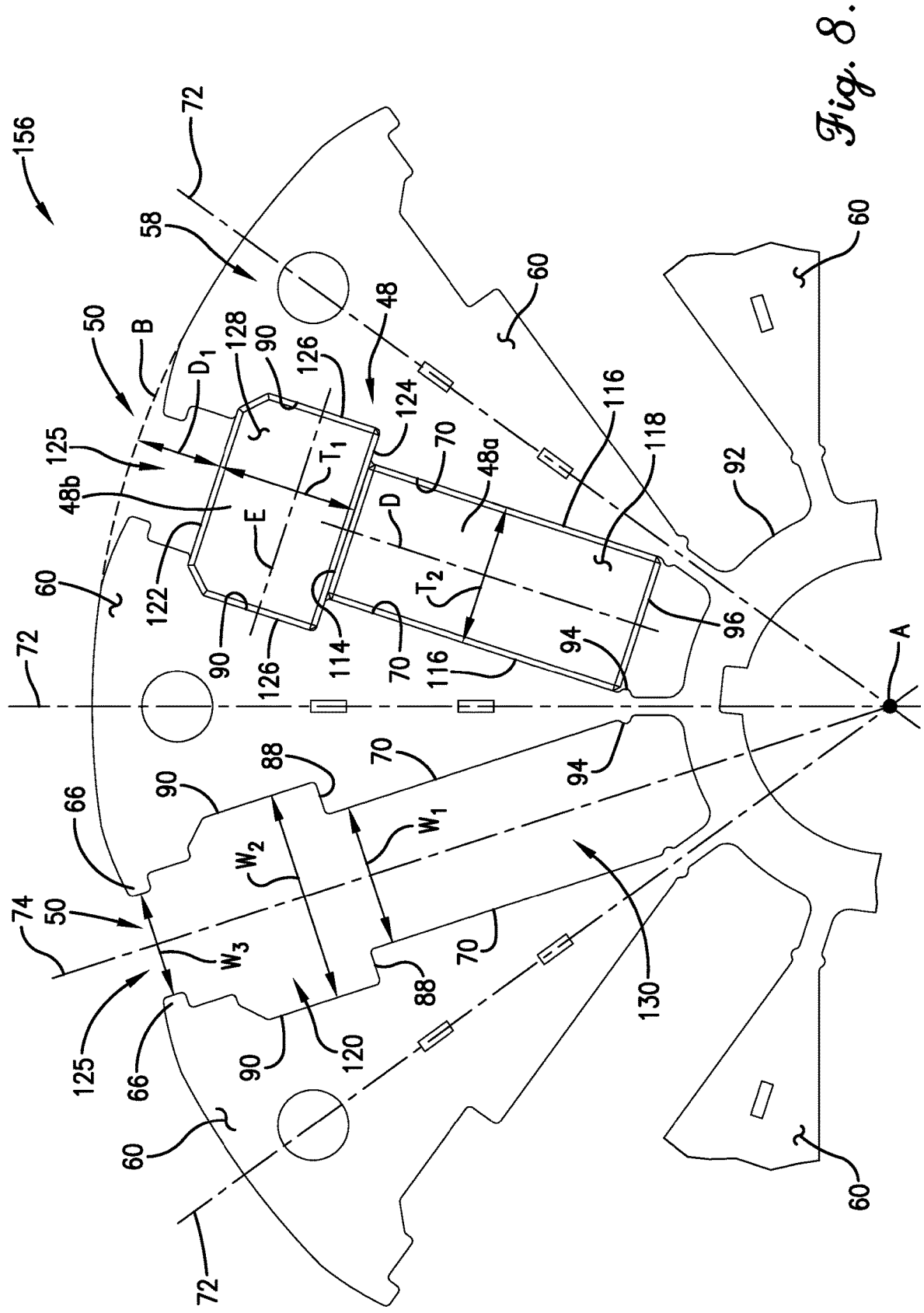
FIG. 8 is another enlarged, fragmentary front plan view of an outer portion of the lamination shown in FIG. 6.

FIG. 5 is a perspective view of a stack of laminations 56, in accordance with one aspect of the present invention. FIG. 6 is a front plan view of one of the laminations 156 of the lamination stack 56 shown in FIG. 5. FIGS. 7 and 8 are enlarged fragmentary front plan views of an outer portion of the lamination 156 shown in FIG. 6, particularly illustrating geometric features thereof. FIG. 9 is an enlarged fragmentary front plan view of the central portion of the lamination 156 shown in FIG. 6, particularly illustrating geometric features thereof. Referring to FIG. 6, as described above, the lamination 156 defines ten (10) pole sectors 58. Each of the magnet receiving slots 50 are positioned radially outward from the rotation axis "A" of the rotor core 24, which is shown as the center of the lamination 156.

The laminations 156 include a plurality of central slot axes 72. A plurality of radial pole pitch lines 74 extend through the center of the laminations 156 (e.g., the rotation axis "A"), with each radial pole pitch line 74 being centered angularly between an adjacent pair of the magnet receiving slots 50, such that each adjacent pair of the magnet receiving slots 50 are disposed symmetrically about the respective radial pole pitch line 74. Each radial pole pitch line 74 defines the boundary between two adjacent pole sectors 58, wherein adjacent radial pole pitch lines 74 define a pole sector 58 therebetween. Each central slot axis 72 passes through the rotation center of the lamination 156 and bisects the respective pole sector 58 (i.e., is angularly centered between adjacent radial pole pitch lines 74). In FIG. 6, only four (4) of the slot axes 72 are shown for clarity.

The laminations 156 preferably include a plurality of substantially similar pole segments 60 arranged arcuately about the rotation axis "A" (or, as alternatively described, about the rotor shaft 28). The pole segments 60 extend from a central hub portion 92 of the laminations 156. In a preferred embodiment, as depicted in FIG. 4, the pole segments 60 alternate arcuately with the respective magnets 48, such that each of the magnets 48 is interposed between circumferentially adjacent pole segments 60.

Preferably, the pole segments 60 are evenly spaced about the rotation axis "A." Each of the magnets 48 is preferably centrally positioned between circumferentially adjacent pole segments 60. Further, each of the magnets 48 is preferably in direct contact with circumferentially adjacent ones of the pole segments 60. It is noted, however, than in certain aspects of the present invention, uneven or variable spacing of the pole segments 60 may be used.

In the exemplary embodiment, the lamination stack 56 has a thickness in a range between and including about five tenths of an inch (0.5") and about seven tenths of an inch (0.7"). However, in other aspects of the present invention, the lamination stack thickness may include any alternative measures that enable the lamination stack 56 to function as described herein. The above range increases strength and decreases manufacturing costs of the rotor core 24.

Referring to FIG. 6, the pole segments 60 include a radially outer surface 62 that, at least in part, cooperatively define an annular nominal circumferential surface, denoted by reference character "B." It is noted that the annular nominal circumferential surface "B" is an imaginary shape that generally corresponds with the radially outermost dimension of the laminations 156.

In the exemplary embodiment, the pole segments 60 are formed substantially symmetrical with respect to the radial pole pitch lines 74. Each pole segment 60 includes a body 64 and a pair of tabs 66. Each tab 66 extends generally arcuately outwardly (e.g., generally circumferentially) from the body 64 in opposition to each other.

As depicted in FIG. 6, the body 64 is generally wedge shaped. In particular, the body 64 includes the radially outer surface 62 (described above), which is substantially centered about the corresponding radial pole pitch line 74. The body 64 further includes a pair of arcuately spaced, opposing body margins 68 and a pair of arcuately spaced, opposing sidewalls 70 that extend generally radially from the body margins 68. In particular, in a preferred embodiment, the sidewalls 70 of a given pole segment 60 each extend inwardly (i.e., taper) toward each other, each being substantially parallel to a respective central slot axis 72. As such, adjacent sidewalls 70 of each pair of adjacent pole segments 60 extend substantially parallel to each other. This is advantageous in that commonly available flat rectangular slab-shaped magnets, such as the magnet stem portions 48a, may be used in the rotor assembly 14.

Each of the tabs 66 includes a radially outermost arcuate tab face 76 that extends generally circumferentially directly from a corresponding one of the body margins 68. It is contemplated, however, that the tab faces 76 may be substantially planar and/or have other geometric features according to some aspects of the present invention. Each of the tabs 66 also includes a radially innermost tab face 78 positioned radially inward of a corresponding tab face 76. The innermost tab faces 78 extend directly from a corresponding one of the sidewalls 70. Each of the tabs 66 also include a tip face 80. Each tip face 80 is generally arcuately spaced from the body 64 and extends generally radially between and interconnects corresponding tab faces 76 and 78.

In the exemplary embodiment, each of the radially outer surfaces 62 of the pole segments 60 are formed concentric with the rotation axis "A." That is, each of the radially outer surfaces 62 extends along a circular path and has its center of curvature coincident with the rotation axis "A." Alternatively, in certain aspects of the present invention, it is contemplated that the radially outer surfaces 62 include alternative geometries.

As described above, the outermost tab faces 76 extend generally circumferentially from the body margins 68. In addition, in the exemplary embodiment, the tab faces 76 extend radially inward from the corresponding body margins 68. That is, each of the tab faces 76 extends radially inward so as to be positioned radially inside the annular nominal circumferential surface "B." The innermost tab faces 78 of the tabs 66 and each corresponding one of the sidewalls 70 form an approximate right angle (i.e., 90° angle) therebetween.

As depicted in FIG. 7, the body 64 further includes a pair of arcuately spaced, opposing notches 82, each being defined in a respective one of the sidewalls 70. In particular, for each opposing notch 82, the body 64 includes a radially outermost notch face 84 that extends generally circumferentially inward from the sidewall 70 toward the corresponding radial pole pitch line 74 of the respective pole segment 60. The outermost notch face 84 is spaced radially inward of the annular nominal circumferential surface "B" a predetermined distance, as describe further below. The outermost notch faces 84 and each corresponding one of the sidewalls 70 form an approximate right angle (i.e., 90° angle) therebetween. The body 64 also includes a taper wall 86 that extends generally inward directly from the outermost notch face 84 at an angle α. The angle α is preferably between and including about thirty degrees (30°) and sixty degrees (60°). In a preferred embodiment, the angle α is about forty-five degrees (45°).

Furthermore, the body 64 includes a radially innermost notch face 88 that extends generally circumferentially inward from the sidewall 70. In a preferred embodiment, the innermost notch face 88 is substantially parallel to the outermost notch face 84. The body 64 also includes a notch sidewall 90. Each notch sidewall 90 is generally arcuately spaced from a respective sidewall 70 and extends generally radially between and interconnects corresponding ones of the taper walls 86 and notch faces 88. In particular, in a preferred embodiment, the notch sidewalls 90 of a given pole segment 60 each extend inwardly (i.e., taper) toward each other, each being substantially parallel to a respective sidewall 70 (or respective central slot axis 72). As such, adjacent notch sidewalls 90 of each pair of adjacent pole segments 60 extend substantially parallel to each other. As with the geometry of the sidewalls 70 described above, this is advantageous in that commonly available flat rectangular slab-shaped magnets, such as the magnet arm portions 48b, may be used in the rotor assembly 14.

Referring to FIG. 8, adjacent pairs of pole segments 60 cooperate to define the "T" shaped magnet receiving slots 50. The notches 82 cooperate to define a slot arm portion 120 of the magnet receiving slot 50, which is configured to receive the magnet arm portion 48b therein. Likewise, the sidewalls 70 cooperate to define a slot stem portion 130 of the magnet receiving slot 50, which is configured to receive the magnet stem portion 48a therein. It is noted, however, that according to some aspects of the present invention, the pole segments 60 of the laminations 156 may not include opposing notches 82.

Further, each magnet receiving slot 50 presents an open slot aperture 125 that extends between the slot arm portion 120 and the annular nominal circumferential surface "B." As depicted, the slot aperture 125 is, in part, defined by the tabs 66 of adjacent pairs of pole segments 60.

In the exemplary embodiment, the slot stem portion 130 has a circumferential extending first slot width $W_1$ that is sized to receive a respective magnet stem portion 48a therein. In a preferred embodiment, the first slot width $W_1$ is in a range between and including about forty-five hundredths of an inch (0.45") and about fifty hundredths of an inch (0.50"). In other aspects of the present invention, the first slot width $W_1$ may be any measure that enables the lamination 156 to function as described herein.

The slot arm portion 120 is located radially outward of the slot stem portion 130 and, as described herein, is oriented substantially perpendicular to the slot stem portion 130. The slot arm portion 120 has a circumferential extending second slot width $W_2$ that is sized to receive a respective magnet arm portion 48b therein. In a preferred embodiment, the second slot width $W_2$ is in a range between and including about sixty-five hundredths of an inch (0.65") and about seventy-five hundredths of an inch (0.75"). In other aspects of the present invention, the second slot width $W_2$ may be any measure that enables the lamination 156 to function as described herein.

In the exemplary embodiment, the slot aperture 125, located radially outward of the slot arm portion 120, has a circumferential extending third slot width $W_3$. In a preferred embodiment, the third slot width $W_3$ is in a range between and including about thirty hundredths of an inch (0.30") and about forty hundredths an inch (0.40"). In other aspects of the present invention, the third slot width $W_3$ may be any measure that enables the lamination 156 to function as described herein.

Referring to FIG. 9, the body 64 of the pole segments 60 includes magnet locating structure including a pair of arcuately spaced, opposing radially inner tabs 94. More particularly, inner tabs 94 include generally circumferentially extending nubs configured to restrict radially inward shifting of corresponding ones of the magnets 48. Referring to FIG. 4, a radially innermost face 96 of each magnet stem portion 48a is preferably spaced from but adjacent a corresponding pair of the inner tabs 94. In certain other aspects of the present invention, alternative or additional means of restricting such shifting are permissible. In a preferred embodiment, the inner tabs 94 facilitate fixation of the magnet stem portions 48a. Furthermore, the magnet stem portions 48a might instead or additionally be secured or restricted by means of radially inner, generally radially extending tabs or other geometric features defined by the pole segments and/or the central hub portion 92 of the laminations 156.

In the exemplary embodiment depicted in FIG. 9, the central hub portion 92 includes a central shaft-receiving opening 98 defined therethrough. The central shaft-receiving opening 98 is substantially concentric with the rotation axis "A." The central hub portion 92 includes a pair of arcuately spaced, axially extending grooves 100 and 102 defined along an inner surface 104 of the central shaft-receiving opening 98. The grooves 100 and 102 are configured to cooperate with the keyway slot 54 (shown in FIG. 3) to facilitate clocking the laminations 156 of the rotor core 24 in a predetermined position.

The groove 100 is defined in the central hub portion 92 and has a central axis 106. In the exemplary embodiment, the central axis 106 of the groove 100 is angularly offset from a respective one of the radial pole pitch lines 74 a predetermined angle "C." In some embodiments, the central axis 106 may be aligned with a respective radial pole pitch line 74, however, In a preferred embodiment, the predetermined angle "C" is about four degrees (4°). However, in other embodiments of the present invention, the predetermined angle "C" may be any angle measure that enables the lamination 156 to function as described herein.

Furthermore, the groove 102 also includes a central axis 108. In the exemplary embodiment, the central axis 108 of the groove 102 is angularly offset from the central axis 106 of the groove 100 a predetermined angle "D." In a preferred embodiment, the predetermined angle "D" is about one hundred and fifty-two degrees (152°). However, in other embodiments of the present invention, the predetermined angle "D" may be any angle measure that enables the lamination 156 to function as described herein.

Referring to FIGS. 3 and 8 generally, as described herein, the magnets 48 include the magnet stem portion 48a and the magnet arm portion 48b. Each of the magnet stem portions 48a and 48b preferably have a generally cuboid shape. More particularly, the magnet stem portion 48a preferably presents the radially innermost face 96, a radially outermost face 114, a pair of circumferentially spaced apart side faces 116, and axially spaced apart end faces 118. The faces 96,114, 116,118 are preferably at least substantially flat and arranged in a cuboidal manner. Further, the magnet arm portion 48b preferably presents the radially outermost face 122, a radially innermost face 124, a pair of circumferentially spaced apart side faces 126, and axially spaced apart end faces 128. The faces 122,124,126,128 are preferably at least substantially flat and arranged in a cuboidal manner. It is permissible according to some aspects of the present invention, however, for the magnet shapes to vary (e.g., via the provision of one or more curved faces and/or non-orthogonal interfaces between the faces), although the sides of the adjacent pole segments are most preferably complementally shaped.

In the exemplary embodiment, each magnet stem portion 48a is located in a respective slot stem portion 130 and extends radially relative to the rotation axis "A." The radially innermost face 96 of each magnet stem portion 48a is preferably spaced from but adjacent corresponding ones of the magnet retaining inner tabs 94. Each of the side faces 116 preferably directly abuts a corresponding one of the pole segment sidewalls 70. Further, each singular magnet arm portion 48b is located in a respective slot arm portion 120 and extends generally circumferentially in opposite directions relative to the magnet stem portion 48a. The radially innermost face 124 of each magnet arm portion 48b directly abuts a corresponding one of the magnet stem portion's radially outermost faces 114, such that the magnet 48 is continuous. In some embodiments, however, a gap may be defined between the radially innermost face 124 of each magnet arm portion 48b and a corresponding one of the magnet stem portion's radially outermost faces 114. Further, in other embodiments of the present invention, only a portion of each magnet arm portion 48b is located radially outward from a corresponding one of the magnet stem portion's radially outermost faces 114. For example, each magnet arm portion 48b may include a notch in the radially innermost face 124 for receiving a portion of a corresponding one of the magnet stem portions 48a and associated radially outermost face 114.

In the exemplary embodiment, each of the side faces 126 of each magnet arm portion 48b preferably directly abuts a corresponding one of the notch sidewalls 90. The magnet stem portion 48a and corresponding magnet arm portion 48b in a respective magnet receiving slot 50 are substantially perpendicular to each other, forming a "T" shaped magnet 48, as described above. It should be noted that while the exemplary embodiment describes a single stem magnet and a single corresponding arm magnet forming a "T" shaped magnet, it is contemplated that in certain aspects of the present invention, more than one arm magnet may be incorporated into the rotor core. For example, in some embodiments, a single stem magnet may include two (2) or more adjacent, circumferential extending arm magnets positioned at least partially radially outward therefrom. The arm magnets may have different circumferential lengths, such that the arm magnets cooperate with the stem magnet to form an inverted stepped wedge shape.

As described above, the magnet arm portion 48b is located radially inward relative to the nominal outer circumferential surface "B" of the rotor core 24 to facilitate decreasing a demagnetizing field intensity potentially generated by the windings of the electric machine. In particular, the radially outermost face 122 is spaced a predetermined distance Di from the nominal outer circumferential surface "B." In a preferred embodiment, the distance Di is in a range between and including about twenty-five hundredths of an inch (0.25") and about thirty hundredths of an inch (0.30"). It is noted, however, that in certain other aspects of the present invention, the distance Di may be any measure that enables the rotor core 24 to function as described herein.

In the exemplary embodiment, the magnet arm portion 48b has a magnet thickness $T_1$ measured in the radial direction. In a preferred embodiment, the thickness $T_1$ is in a range between and including about forty-five hundredths of an inch (0.45") and about fifty hundredths of an inch (0.50"). In other aspects of the present invention, the magnet thickness $T_1$ may be any measure that enables the magnet arm portion 48b to function as described herein. Furthermore, the magnet stem portion 48a has a magnet thickness $T_2$ measured in the tangential direction, perpendicular to the radial direction. In a preferred embodiment, the thickness $T_2$ is substantially the same as the thickness $T_1$ of the magnet arm portion 48b. As described above, the magnet arm portion 48b (i.e., the horizontal portion of the "T" shaped magnet 48) is magnetized to preserve the generally circumferential direction of the magnetic poles. That is, the north and south poles of the magnet arm portion 48b are defined on the circumferentially spaced apart side faces 126. The magnet stem portion 48a is magnetized such that the north and south poles of the magnet stem portion 48a are defined on the circumferentially spaced apart side faces 116. Furthermore, the directions of polarity of respective pairs of the magnets 48a and 48b (i.e., magnets 48) are preferably alternated. More particularly, the north pole of a first one of the magnets 48 preferably faces the north pole of a second one of the magnets 48, etc. That is, each pole segment 60 preferably abuts only like poles of the adjacent magnets 48, with the pole segments 60 therefore themselves alternating in polarity.

As depicted in FIG. 8, the magnet stem portion 48a defines a radially extending longitudinal axis "D," which is centrally located on the magnet in the tangential direction. Similarly, the magnet arm portion 48b defines a circumferentially extending longitudinal axis "E" centrally located on the magnet in the radial direction. In a preferred embodiment, the longitudinal axes "D" and "E" are perpendicular to each other. Further, in a preferred embodiment, the magnet arm portion 48b extends in opposite directions relative to the longitudinal axis "D." That is, the magnet arm portion 48b is substantially centered relative to the magnet stem portion 48a, defining the "T" shaped magnet 48. It is noted, however, that unequal circumferential extension of the magnet arm portion 48b is contemplated in certain aspects of the present invention.

In a preferred embodiment, the magnets 48 are permanent magnets. Furthermore, the magnets 48 preferably include ferrite. However, according to certain aspects of the present invention, other magnet materials (e.g., neodymium and other rare earth materials) may be used.

In operation, the rotor assembly 14 is assembled by first fabricating a plurality of laminations 156 arranged in a plurality of lamination stacks 56. As described above, the laminations 156 may be fabricated from a suitable material, including, for example, and without limitation, a magnetically permeable material, such as iron, steel, or a steel alloy, by machining, stamping, punching, and/or using other suitable lamination forming techniques. Following fabrication of the laminations 156 into laminations stacks 56, magnets 48 (e.g., magnet stem portions 48a and magnet arm portions 48b) are inserted into the magnet receiving slots 50 as described above. The lamination stacks 56 are oriented and stacked as described below. The plurality of laminations 156 of each lamination stack 56 are preferably interlocked (e.g., coupled to each other), although certain aspects of the present invention contemplate the use of loose laminations.

As described above, to define the skewed configuration of the rotor core 24, axially adjacent lamination stacks 56 are rotated about the rotation axis "A" a predetermined amount relative to each adjacent stack of laminations. In a preferred embodiment, the rotor core 24 includes 4 lamination stacks 56 (see FIG. 3), each angularly offset from an adjacent lamination stack 56.

In an example, a first lamination stack 56 (e.g., the lamination stack 56 nearest the first end 52 of the rotor shaft 28) is positioned on the rotor shaft 28 with the groove 100 aligned with the keyway slot 54 and its axial face 112 presented toward the first end 52. A second lamination stack 56 is then positioned on the rotor shaft 28 with the groove 102 aligned with the keyway slot 54 and its axial face 110 being presented toward the first end 52. In this way, the opposite axial faces 110 and 112 of adjacent lamination stacks 56 abut each other in face-to-face contact. As such, the second lamination stack 56 is angularly offset about four degrees (4°) relative to the abutting first lamination stack 56. A third lamination stack 56 is then positioned on the rotor shaft 28 with the groove 102 aligned with the keyway slot 54 and its axial face 112 being presented toward the first end 52. That is, the first and third lamination stacks 56 (in serial arrangement) have the same axial face (e.g., axial face 112) presented toward the first end 52 of the rotor shaft 28. However, the first and third lamination stacks 56 are angularly offset based on different groove (e.g., the grooves 100 and 102) being aligned with the keyway slot 54. A fourth lamination stack 56 is then positioned on the rotor shaft 28 with the groove 100 aligned with the keyway slot 54 and its axial face 112 being presented toward the first end 52 of the rotor shaft. As such, each lamination stack 56 is rotated in the same direction an amount equal to about four degrees (4°) relative to adjacent laminations.

Referring to FIG. 4, in an alternative embodiment, the open slot apertures 125 that extend between the slot arm portions 120 and the annular nominal circumferential surface "B" may be filled with a non-ferrous material 132. The non-ferrous material 132, acting similarly to simple empty space where magnetic forces are concerned, may be substituted for the empty space defined by the open slot apertures 125 as long as eddy currents induced by the rapidly changing magnetic fields of the electric motor 10 do not create too much power loss in the non-ferrous material. The non-ferrous material 132 may aid in securement of the magnet arm portions 48b and facilitate reducing windage losses due to the rapidly spinning rotor assembly during operation of the electric motor 10. Examples of non-ferrous materials that may be utilized to fill the open slot apertures 125, include, but are not limited to, synthetic resins, plastic, epoxies, and the like.

Advantageously, embodiments of the present invention provide for increasing the volume of a magnetic material in a rotor pole of an electric motor without the need to use tapered magnets. By providing a "T" shaped magnet fabricated from commonly available slab-type magnets, the magnetic flux density may be increase for each rotor pole. The use of commonly available slab-type magnets results in increasing the manufacturability while decreasing the manufacturing cost of the disclosed rotor assemblies by reducing the need for specially fabricated magnets. Another advantage of the present invention is that the known susceptibility of demagnetization of the magnets potentially generated by the windings of the electric motor is decreased by spacing the magnets radially inward from the outer rotor surface, while an overall magnetic flux density is maintained or increased by the increased volume of magnetic material.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The invention claimed is:

1. A rotor assembly for an electric motor, said rotor assembly comprising:
   a rotor core defining a rotational axis and presenting an outer circumferential core surface,
   said rotor core including a plurality of axially extending magnet slots, each of which presents a slot stem portion extending radially relative to the rotational axis, a slot arm portion, and a slot aperture extending outward from the slot arm portion,
   said slot stem portion and said slot aperture being defined by a pair of radially extending, opposing sidewalls,
   each sidewall having a circumferentially extending outer tab located proximate the outer circumferential core surface and spaced from the slot arm portion; and
   a plurality of magnets spaced arcuately about said rotor core,
   each of said magnets including a magnet stem portion and a magnet arm portion,
   said magnet stem portion being received in the slot stem portion and extending radially relative to the rotational axis to present a radially outermost stem end,
   said magnet arm portion being received in the slot arm portion and located at least in part radially outward from the stem end and extending circumferentially in opposite directions relative to the magnet stem portion.

2. The rotor assembly in accordance with claim 1,
   each of said magnet stem and arm portions having a cuboid shape.

3. The rotor assembly in accordance with claim 2,
   said magnet stem and arm portions being arranged substantially perpendicularly relative to one another.

4. The rotor assembly in accordance with claim 3,
said magnet arm portion being entirely located radially outward from the magnet stem portion.

5. The rotor assembly in accordance with claim 4,
said magnet stem and arm portions being in contact with one another, such that each magnet is continuous.

6. The rotor assembly in accordance with claim 5,
said magnet arm portion being singular, such that each magnet is T-shaped and includes only the singular magnet arm portion located radially outward from the magnet stem portion.

7. The rotor assembly in accordance with claim 6,
said magnet arm portion presenting an arm thickness measured in a radial direction,
said magnet stem portion presenting a stem thickness measured in a tangential direction perpendicular to the radial direction,
said arm and stem thicknesses being substantially equal.

8. The rotor assembly in accordance with claim 7,
said magnet stem portion defining a longitudinal stem axis that extends radially and is centrally located in the tangential direction,
said magnet arm portion extending equally in opposite directions relative to the longitudinal stem axis.

9. The rotor assembly in accordance with claim 1,
said magnet arm portion being spaced from the outer circumferential core surface.

10. The rotor assembly in accordance with claim 9,
said rotor core presenting a radially innermost hub that defines a central shaft-receiving opening,
said magnet stem portion being spaced from the hub.

11. The rotor assembly in accordance with claim 1,
said aperture being open.

12. The rotor assembly in accordance with claim 1,
each of said magnet slots being T-shaped.

13. The rotor assembly in accordance with claim 1,
said rotor core comprising a plurality of pole segments circumferentially spaced from one another, with a respective one of the magnet slots being defined between adjacent pole segments,
each pole segment including magnet-locating structure.

14. The rotor assembly in accordance with claim 13,
said magnet-locating structure comprising a circumferentially extending radially inner tab,
said radially inner tab extending into the slot stem portion of the corresponding magnet slot.

15. The rotor assembly in accordance with claim 1,
said magnet arm portion being entirely located radially outward from the magnet stem portion,
said magnet stem and arm portions being in contact with one another, such that each magnet is continuous.

16. The rotor assembly in accordance with claim 1,
said slot arm portion having a circumferentially extending first slot width,
said slot aperture having a circumferentially extending second slot width,
said first slot width being greater than said second slot width.

* * * * *